July 27, 1954 R. L. HARTER 2,684,732
REVSER FOR LUBRICATING SYSTEMS
Filed Aug. 30, 1949 3 Sheets-Sheet 1
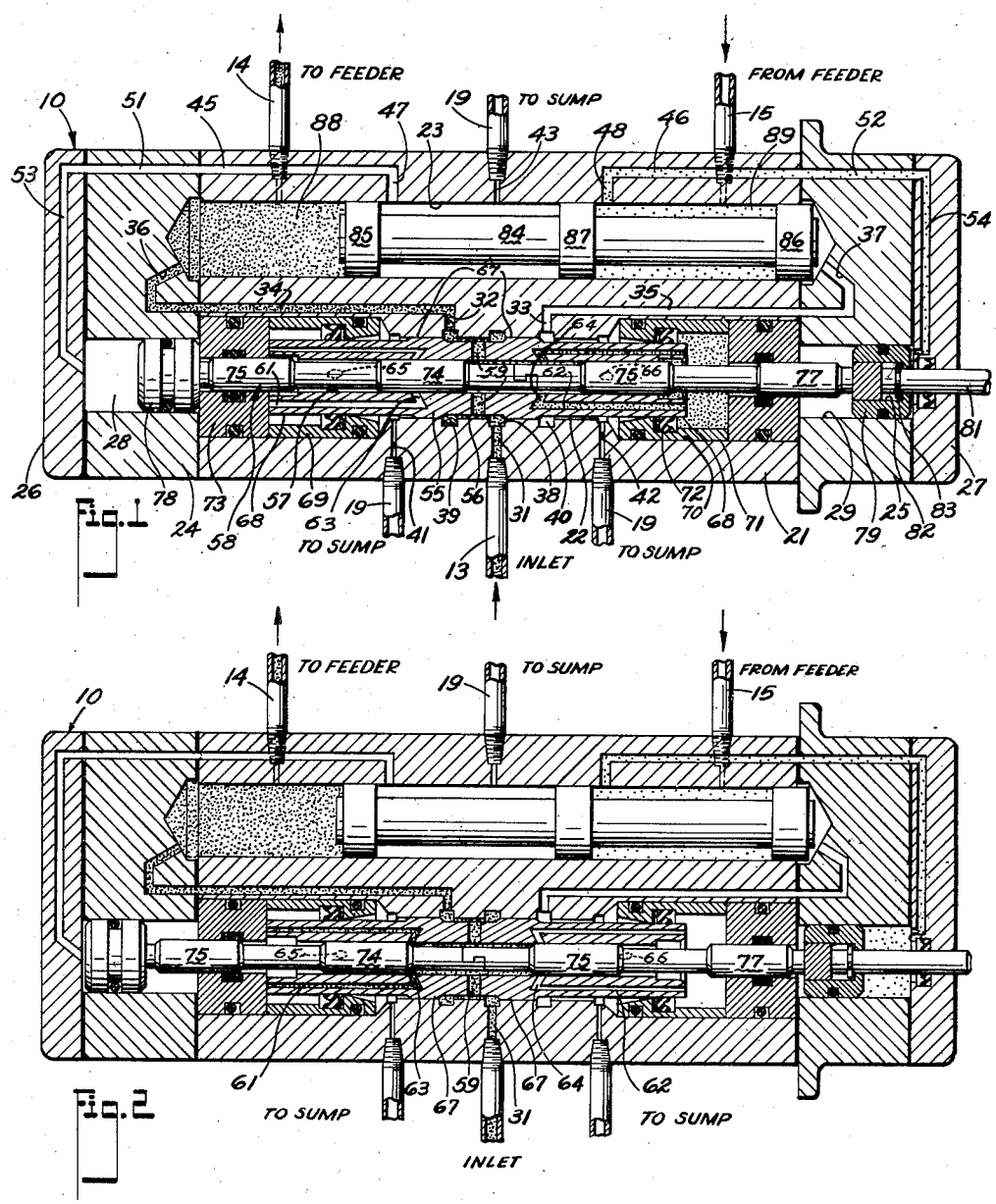
INVENTOR.
ROBERT L. HARTER
BY Richey + Watts
ATTORNEYS

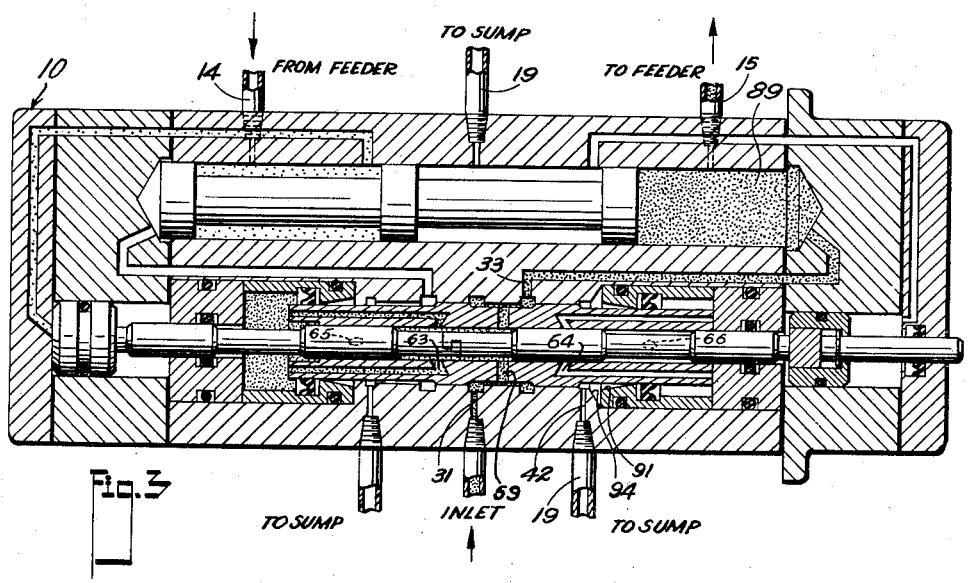
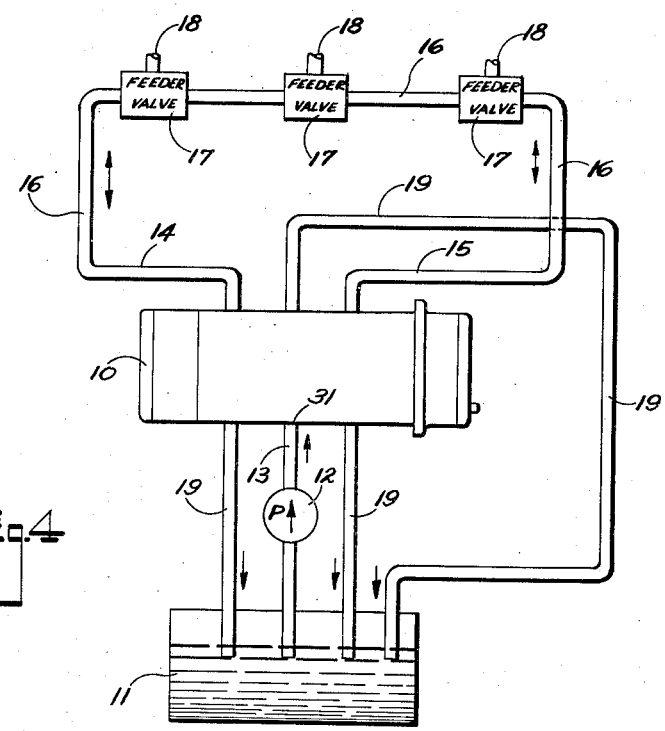

July 27, 1954    R. L. HARTER    2,684,732
REVERSER FOR LUBRICATING SYSTEMS
Filed Aug. 30, 1949    3 Sheets-Sheet 3
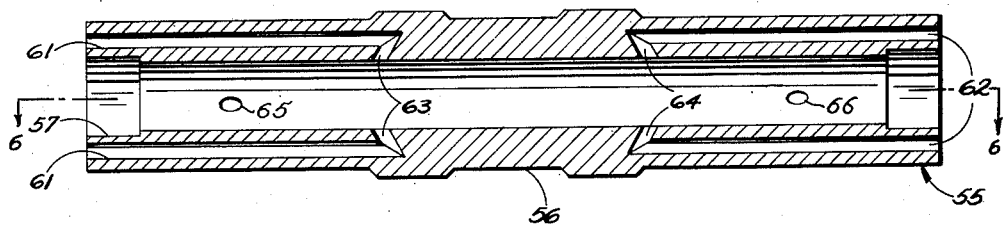
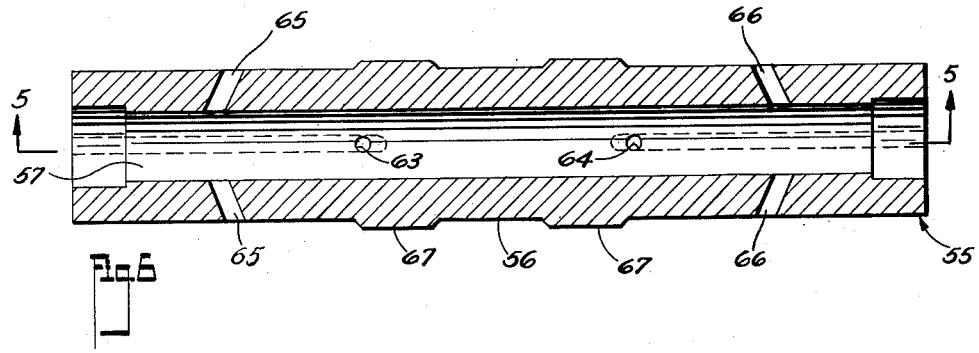
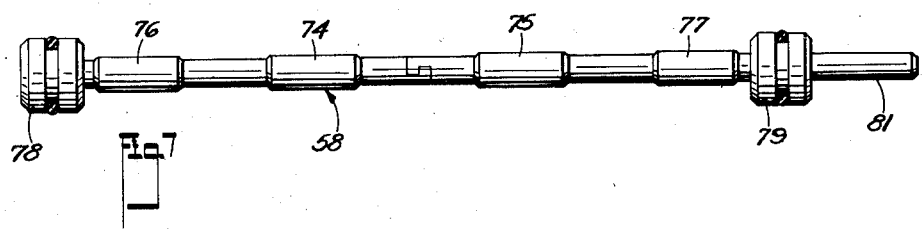
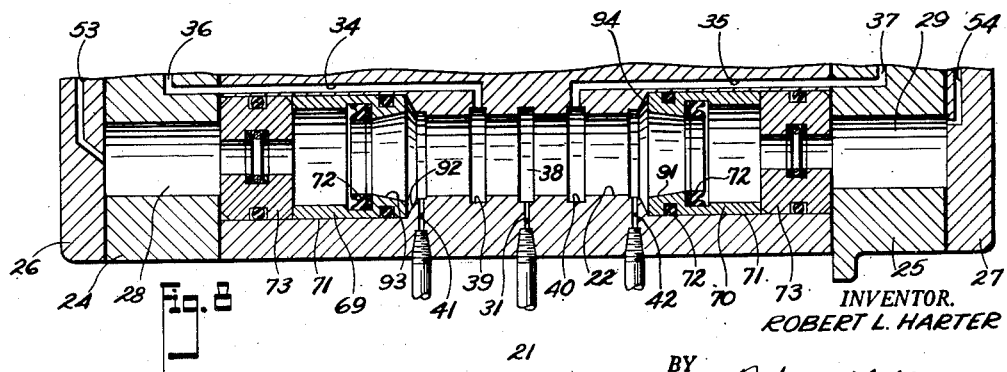
INVENTOR.
ROBERT L. HARTER
BY
Richey & Watts
ATTORNEYS Patented July 27, 1954

2,684,732

UNITED STATES PATENT OFFICE 2,684,732

REVERSER FOR LUBRICATING SYSTEMS

Robert L. Harter, Shaker Heights, Ohio, assignor to Trabon Engineering Corporation, Cleveland, Ohio, a corporation of Ohio Application August 30, 1949, Serial No. 113,189

19 Claims. (Cl. 184—7)

This invention relates to reversers for conduit or pipe line circuits.

It is an object of the invention to bring about automatically a reversal of flow of substance in a conduit or pipe line especially in such systems as automatic lubricating systems or other systems in which a substance capable of being delivered through a pipe is supplied to feeders or measuring valves spaced along the pipe, and the feeders or measuring valves are of the type which are actuated for supplying a measured quantity of a substance each time a reversal of flow through the pipe line takes place.

Although the invention is especially adapted to use in lubricating systems, it is not limited thereto and may be employed in connection with any reversible system for supplying fluids of the consistency of lubricating oil or grease as well as other liquid, gaseous and plastic substances.

An object of the invention is to assure the continuity of flow of the substance in a given direction until reversal has definitely been established regardless of the viscosity or density of the substance and to obtain positive action in the reversal as well as avoiding wire drawing or partial throttling of the valve and stalling of the reverser mechanism. More specifically, it is an object of the invention to assure maintenance of the valve in a fully open position for either direction of flow and positive, rapid shifting in position after reversing movement of the valve begins to take place. It is an object to avoid what is known as "bouncing" or a second reversal of position of the valve before grease has been supplied to the system.

Other objects, features and advantages of the invention will become apparent as the description proceeds.

In carrying out the invention in accordance with a preferred form thereof, I provide a housing having an inlet port leading to a reversing valve bore in which a hollow valve member is longitudinally slidable for accomplishing the actual reversal of the valve functioning. The same housing preferably has also a diverter valve bore containing a slidable plunger for automatically applying the pressure of returning fluid for the actuation of the valve reversing mechanism. In order to assure positive actuation of the slidable valve member, which accomplishes the reversal of flow, a pilot valve rod is provided, which is slidable within the hollow valve member, and which has pistons at the ends cooperating with suitable cylindrical chambers for response to the pressure of the return fluid directed by the diverter valve plunger.

Passageways and ports are provided in the hollow valve member controlled by the relative position of the pilot valve rod for enabling the pressure of the inlet fluid itself to be directed against one end or the other of the hollow valve member for shifting it to one position or the other in the reversing valve bore for reversal of flow between the outlet ports of the reversing valve bore.

A better understanding of the invention will be afforded by the following detailed description, considered in conjunction with the accompanying drawings, in which Fig. 1 is a longitudinal sectional view of an automatic reverser forming an embodiment of the invention with connections to a fluid source and fluid-supplied circuit indicated, and showing the parts in position for flow in a given directon from the source through the suppled circuit.

Fig. 2 is a view of the apparatus of Fig. 1 illustrtaing the first step in the movement of the parts for obtaining a reversal of the direction of flow accomplished by the setting shown in Fig. 1, Fig. 3 is a view of the apparatus of Figs. 1 and 2 with all of the parts moved to the opposite positions from those shown in Fig. 1, for producing flow in the opposite direction through the circuit supplied with fluid and showing the position of parts which are about to initiate the steps for again reversing the position of parts, Fig. 4 is a schematic diagram of a fluid distribution system in which the automatic reverser represented in Figs. 1, 2 and 3 may be employed, Fig. 5 is a view at double scale of the hollow valve member in the apparatus of Figs. 1, 2 and 3, Fig. 6 is a view of member of Fig. 5, represented as cut by a medial longitudinal plane perpendicular to the cutting plane of Fig. 5.

Fig. 7 is a view of the pilot valve rod of the apparatus of Figs. 1, 2 and 3, and, Fig. 8 is a fragmentary view of the apparatus of Figs. 1, 2 and 3 with the parts shown in Figs. 5 and 7 omitted for clarity.

Like reference characters are utilized throughout the drawings to designate like parts.

As illustrated in Fig. 4, there is an automatic reversing valve 10 constructed in accordance with my invention, which is adapted to cause fluid pumped from a sump or a reservoir 11 by a pump 12, through an inlet pipe 13, to be supplied alternately to one end 14 or the other end 15 of a pipe or conduit circuit 16. The latter may include a plurality of feeder valves or measuring valves of the type, e. g., described in one of the Hillis Patents 1,997,406, 2,124,948 and 2,168,936, such feeder valves are adapted to supply a fixed quantity of lubricant or other substance through an outlet 18 to a bearing or the like each time the flow of fluid through the feeder valve is reversed.

As will be described in more detail hereinafter, the reverser 10 is so arranged as to accomplish a reversal of flow through the circuit 16 whenever a substance being supplied through one end, for example, the end 14 has filled all of the feeder valves 17 and has reached the other end of the circuit, in this case, the end 15. Preferably, one or more exhaust lines 19 are provided for returning to the sump or reservoir 11 any unused substance from auxiliary passageways or chambers in the reversing valve 10.

Referring to Figs. 1 to 3, the specific form of reverser 10 illustrated comprises a housing 21 having a reverser valve bore 22 and a diverter valve bore 23 therein. For convenience in manufacturing operations, the bores 22 and 23 extend the length of the housing 21 and end blocks 24 and 25, with caps 26 and 27 being provided to close the bores 22 and 23. Preferably extensions of the bore 22 are formed as cylindrical chambers 28 and 29 in the blocks 24 and 25 respectively. The reverser valve bore 22 is provided with an inlet port 31 communicating with the inlet pipe 13 and a pair of outlet ports 32 and 33, to which are connected passageways 34 and 35, respectively. For enabling the passageways 34 and 35 to be connected to the corresponding opposite ends of the diverter valve bore 23, continuous passageways 36 and 37 are formed in the blocks 24 and 25 respectively. To assure pressure balance around the axis of the member 55, annular grooves 38, 39 and 40 are cut around the bore 22 at the locations of the ports 31, 32 and 33, respectively. Exhaust ports 41 and 42 are also formed in the housing 21, having communication with annular grooves in the reverser valve bore 22, for making connection with discharge pipes 19 to the sump 11. A similar exhaust port 43 is formed in the housing 21 to communicate with the diverter valve bore 23 and is preferably positioned centrally with respect to the ends of the bore 23. However, any position intermediate the ends near the center is satisfactory.

Return-pressure passageways 45 and 46 are also provided in the housing 21 having outlets 47 and 48 from the diverter valve bore 23 at points disposed between the center of the bore 23 and the ends thereof. In order to enable the return pressure passageways 45 and 46 to be connected to the ends of the cylindrical chambers 28 and 29 in blocks 24 and 25, respectively, continuous passageways are provided, comprising passageways 51 and 52 in blocks 24 and 25, and passageways 53 and 54 in the caps 26 and 27 respectively.

For clarity in the drawing certain passageways such as the passageways 36, 37, 53, 54 have been shown as formed in the interior of the blocks 24, 25 or caps 26 and 27. In actual practice, however, such passageways are preferably formed as slots milled in the faces of the blocks 24 and 25, and closed in the sides when the caps 26, 27 with the block 24 and 25 are bolted to the housing 21.

For enabling the flow of fluid from inlet ports 31 to be directed to one or the other outlet ports 32 and 33 in the reversing valve bore 22, a hollow longitudinal slidable valve member 55 is provided, having an annular recess 56 of sufficient length longitudinally for connecting the port 31 to either the port 32 or the port 33 through the annular grooves 38, 39 and 40 according to whether the slidable valve member 55 is in the longitudinal position illustrated in Fig. 1 or in the opposite longitudinal position illustrated in Fig. 3. The hollow valve member 55 has a coaxial bore 57 adapted to receive a pilot valve rod 58 longitudinally slidable therein. The hollow valve member 55 is provided with transverse passageways or inlet openings 59 for connecting the annular recess 56 to the interior of the hollow valve member 55.

In order to enable the pressure of the fluid entering through the inlet port 31 to effect the appropriate longitudinal movement of the hollow valve member 55, the member 55 is provided with longitudinal passageways 61 and 62 having inlets 63 and 64, respectively from the interior of the hollow valve member 55 and having outlets as shown in the ends of the hollow valve member. For relieving the pressure at the ends of the hollow valve member, at appropriate times, transverse exhaust passageways 65 and 66 are also formed in the hollow valve member 55. The transverse passageways or exhaust openings 65 and 66 extend from the interior of the hollow valve member 55 to the periphery thereof and do not communicate with the longitudinal passageways 61 and 62.

The end portions of the hollow valve member 55 beyond the collars 67 forming the boundaries for the annular groove 56 are of reduced diameter as shown at 68. To facilitate the forming of the bore 22 and obtaining joints of the requisite tightness without affecting slidability of the valve member 55 and the pilot valve rod 58, sealing members 69 and 70 are provided, having O-ring seals or the like within the enlargements 71 of the bore 22. The sealing members 69 and 70 are provided with suitable gaskets 72 for retaining pressure around the reduced-diameter external surface of the hollow member 55. End closure members 73 are also provided.

The pilot valve rod 58, in turn, is provided with sealing heads 74 and 75 slidably fitting the bore of the hollow valve member 55 with sufficient closeness for blocking the inlets 63 and 64 to the longitudinal passageways 61 and 62 or the exhaust openings 65 or 66 according to the longitudinal position of the pilot valve rod 58 with respect to the hollow valve member 55. The length of the sealing heads 74 and 75 and their spacing is such with relation to the spacing between the inlets 63 and 64 and the exhaust openings 65 and 66, that one or the other of the inlets 63 or 64 is always blocked and one or the other of the openings 65 and 66 is always blocked, but an exhaust opening at one end is exposed simultaneously with an inlet to the longitudinal passageway at the opposite end of the hollow valve member 55. The pilot valve rod 58 is provided also with sealing heads 76 and 77 cooperating, if desired, with O-rings or the like for closing the end sealing members 73 where the pilot valve rod passes through.

In order that the pilot valve rod 58 may be actuated by the return pressure through the passageways 53 or 54, pistons 78 and 79 slidably sealed by O-rings or the like in the cylindrical chambers 28 and 29, are secured to the ends of the pilot valve rod 58 or formed thereon. If desired, one of the caps such as the cap 27 may be provided with an opening suitably sealed, through which an end 81 of the pilot valve rod 58 may extend to serve as an indicator of the longitudinal position of the pilot valve rod 58 and therefore serve as an indicator of the functioning of the reversing valve. The protruding end 81 serves also for the operation of auxiliary mechanism, not shown, such as microswitches, remote control devices and the like.

The piston 79 may, if desired, be made hollow with a cylindrical chamber 82 therein, cooperating with a collar 83 secured to the indicator rod 81 to facilitate assembly of parts in the factory.

Mounted within the diverter valve bore 23 there is a diverter valve plunger 84 of smaller axial dimension than the bore 23 having collars 85 and 86 formed at the ends thereof and a collar 87 formed intermediate the ends thereof, each making a slide fit within the diverter valve bore 23. The plunger 84, as shown, is shorter than the bore 23 such that when the plunger 84 is in either extreme position the collar 87 still lies between the exhaust port 43 and one of the return pressure ports 47 and 48; and the collars 85 and 86 each lie beyond one or the other of the ports or inlets 47 and 48 to the return pressure passageways. Furthermore, in either such extreme position of the plunger 84, one end collar lies beyond the feed outlet port 14 or 15 and the other lies between such feeder outlet port and the return pressure port 47 or 48.

Referring to Fig. 4, it will be observed that, in the operation of the apparatus, fluid from the reservoir 11 is supplied under pressure by the pump 12 through the inlet pipe 13 to the inlet port 31. When the parts are in the positions illustrated in Fig. 1, fluid leaves the reverser valve 10 through the pipe 14. The route of the fluid from the pipe 13 is as follows, as indicated by heavily stippled areas:

To the inlet port 31, around the annular grooves 38 and longitudinally along the annular recess 56 in the hollow valve member 55 to the outlet port 32, with the annular groove 39 providing additional cross sectional area to increase the flow, through the passageways 34 and 36, to the left hand end of the diverter valve bore 23, into the portion 88 of the bore 23, and out through the outlet pipe 14 to the feeders 17. The route of the fluid under high pressure is represented by the heavily stippled passageways and chambers. After the fluid has traversed all of the feeder valves 17, and as soon as each of the feeder valves 17 has been supplied with the requisite amount of fluid for which it is designed, fluid begins to return to the diverter valve bore 23 through the end 15 of the feeder valve circuit, entering the opposite end portion 89 of the diverter valve bore 23.

Although the fluid has by this time lost pressure as a result of the unavoidable resistance experienced within the feeder valves and within the piping itself, there is still sufficient pressure as indicated by the lightly stippled passageways for actuating the piston 79 to cause the pilot valve rod 58 to move longitudinally to its opposite position. As shown in Fig. 1, the fluid entering through the pipe 15 travels into the portion 89 of the bore 23 between the collars 86 and 87 of the diverter valve plunger 84 to the port 48 through the passageways 46, 52 and 54, into the end of the cylindrical chamber 29 against the end of the piston 79. The piston 79 and the pilot valve rod 58 are thereby moved to the left to the position illustrated in Fig. 2. It will be observed that the main passageway for the fluid under pressure from inlet port 31 to the feeder line 14 is still as before.

As a result of the movement of the pilot valve rod 58 and its sealing head 74, the inlet 63 to the longitudinal passageway 61 in the hollow valve member 55 is now exposed. An auxiliary or shunt fluid passageway is thereby formed from the inlet port 31 through the transverse passageway 59 or inlet opening to the interior of the hollow valve member 55, through the longitudinal passageway inlet 63, through the longitudinal passageway 61 to the end of the hollow valve member 55 and into the interior of the sealing member 69 whereupon back pressure or reaction is produced upon the hollow valve member 55. Thereby, the pressure applied to the end of the member 55 causes it to move to the right. Since the inlet 63 remains uncovered, the pressure continues to act upon the hollow valve member 55 forcing it further to the right.

At the same time that the inlet 63 is uncovered, the exhaust opening 66 is also uncovered. This permits any fluid within the space within the sealing member 70 to be relieved to the space 91 communicating with a tapered portion 94 of the enlarged portion 71 of the reverser valve bore, which in turn communicates with the exhaust port 42 and the exhaust pipe 19. The hollow valve member 55 accordingly is forced to the opposite end position illustrated in Fig. 3. The inlet port 31 is now connected to the outlet port 33 instead of the outlet port 32 and a new high pressure circuit is formed from the outlet port 33, through passageways 35 and 37, portion 89 of the diverter valve bore 23 to the end 15 of the feeder valve line. The pressure acting against the right-hand side of the collar 86 of the plunger 84, causes it to move to the left to the position shown in Fig. 3. Fluid in the portion 88 of the diverter valve bore 23 is discharged through passageways 36 and 34, along the bore 22, to the exhaust port 41.

Fluid flows in succession from the end 15 of the feeder pipe to each of the feeder valves 17 and eventually reaches the end 14, whereupon the fluid enters the portion 88 of the diverter valve bore 23 traveling through the port 47, passageways 45, 51 and 53 to the cylindrical chamber 28. The pressure acts upon the piston 78 and causes the pilot valve rod 58 to travel from the position illustrated in Fig. 3 back to the position illustrated in Fig. 1. Action similar to that previously described now takes place in a reverse direction, since now the inlet port 64 to the longitudinal passageway 62 in the hollow valve member 55 is exposed and the exhaust passageway 65 at the opposite end is likewise exposed. Pressure acting on the right hand end of the hollow member 55 moves it back to the position illustrated in Fig. 1 and pressure at the other end is relieved through the exhaust passageway 65 and spaces 92 and 93 to the exhaust port 41.

Since pressure is again applied through the passageways 32, 34, 36 and portion 88 of the diverter valve bore 23, pressure acting against the collar 85 of the diverter valve plunger 84 moves the plunger from the position illustrated in Fig. 3 back to the position illustrated in Fig. 1. Through the actuation of the returning fluid, a continuous reversal of flow of the lubricant or other fluid is produced. The system is thus adapted to use any number of feeders or measuring valves and to use feeder valves of any size for measuring large or small quantities of fluid. The speed of the pump 12 may be adjusted for regulation of the number of times fluid is supplied to the feeder valves 17, and if desired, the pump 12 may be arranged for intermittent operation, being restarted with a frequency determined by the desired number of reversals per hour.

The necessity for motion of both the plunger 84 and the pilot valve rod 58 through substantially their respective full strokes before a reversal of position of the hollow valve member 55 can take place guards against "bouncing" or reversal of position of the member 55 again immediately after it has been actuated before any lubricant has been supplied to the feeders 17. If the apparatus were so constructed that reversal took place immediately and the return pressure acted immediately for reversing the valve, difficulty from false operations might be encountered. Thus where a long line of feeders is to be supplied great pressure may be developed in the inlet side of the line, which might act very violently on the reversing pilot valve if it were allowed to do so. If the apparatus were so constructed that return fluid entering at 15 in Fig. 1 caused an immediate reversal of the parts of the valve, the high pressure still existing at 14, owing to the compressibility and expansibility (though slight) of the grease or other fluid might tend to reverse the valve again, without any fluid having flowed to the feeders 17.

In the apparatus, as described, however, such false operations do not occur because what amounts to "lost motion" or time delay is provided in the action. Before any pressure at 14 can act on the piston 78 to initiate a second reversal, the collar 85 of the plunger 84 must move to the left of the port at 14. This provides ample time for the pressure to be relieved because several strokes of the pump 12 are required to supply enough fluid to move the plunger 84 so far as to connect the lines 14 and 45. Furthermore, even if some slight pressure remained in an unusual case, the necessity for moving the piston 78 fully to the right before a reversal of the member 55 could take place (by uncovering inlet 64 and exhaust opening 65), would provide for relief of any possible remaining pressure before a premature actuation of the member 55 could take place.

After the apparatus in normal operation has reached the stage shown in Fig. 2, and after the hollow valve member 55 has moved to the right as shown in Fig. 3 but before the plunger 84 has begun to move, the exhaust port 41 is open to the space 88, because the plunger 84 is still in the position shown in Figs. 1 and 2. The fluid, which has been charged at high pressure into the end 14 of the line of feeders 17, spurts back into the sump 11, passing through passageways 88, 36, 34, 32, 41 and 19, bearing in mind that the member 55 is then in the position shown in Fig. 3 while the plunger 84 is still in the position shown in Fig. 2.

At the same time fluid supplied by the pump 12 through passageways 13, 31, 33, 35 and 37 gradually presses against the collar 86 moving the plunger 84 toward the left. During the time required for the plunger 84 to move to the left the fluid in the end 14 of the line has time to become decompressed and for the pressure to be relieved through the exhaust port 41 as already explained. Even if sufficient pressure remained to move the piston 78 slightly, nothing would happen because the pilot valve rod 58 and piston 78 must move to the right a full stroke to expose the inlet 64 and the exhaust opening 65 in the member 55 (Figs. 3 and 5). A similar condition exists, of course, after the next normal reversal has taken place, the back pressure of compressed fluid then being relieved through the exhaust port 42, prior to the plunger 84 reaching the position of Figs. 1 and 2.

While the invention has been described as embodied in concrete form and as operating in a specific manner in accordance with the provisions of the patent statutes, it should be understood that the invention is not limited thereto, since various modifications will suggest themselves to those skilled in the art without departing from the spirit of the invention, the scope of which is set forth in the annexed claims.

What is claimed is:

1. A lubricating system comprising the combination of a sump for holding lubricant, a feeder circuit for distributing lubricant adapted to receive lubricant at either of two ends and permit flow of excess lubricant from the remaining end, a reverser connected to the two ends of the circuit and to the sump, the reverser including a diverter valve and a diverter valve piston, a reverser valve and a reverser valve piston, and a pilot valve including two opposed pilot valve pistons, and a pump connected to the sump and to the reverser for forcing lubricant from the sump into the reverser for actuating the diverter and reverser valve pistons and through the feeder circuit to actuate the pilot pistons and thereby control the actuation of the diverter and reverser valve pistons, the reverser piston having spaced lands for simultaneously changing the connection of one end of the feeder circuit from the diverter valve to the pilot valve and the remaining end of the feeder from the pilot valve to the diverter valve at either end of the feeder and the diverter valve piston having spaced lands for simultaneously changing the connection of either end of the feeder from the pump to the sump to permit escape of excess accumulated fluid in the end of the feeder circuit and in the reverser valve.

2. A lubricating system comprising the combination of a sump for holding lubricant, a feeder circuit for distributing lubricant adapted to receive lubricant at either of two ends and permit flow of excess lubricant from the remaining end, a reverser connected to the two ends of the circuit and to the sump, and a pump connected to the sump and to the reverser for forcing lubricant from the sump to the reverser, through the feeder circuit to the reverser, and back to the sump, the reverser including a diverter valve, a reverser valve and a pilot valve, the diverter valve serving to connect each end of the feeder circuit either to the reverser valve or to the pilot valve, the reverser valve serving to connect the diverter valve either to the pump or to the sump, and the pilot valve serving to connect the reverser valve to the pump or to the sump, and the reverser valve serving also to connect each end of the feeder circuit to the sump for release of accumulated lubricant pressure before that end of the feeder circuit is connected to the pilot valve.

3. A lubricating system comprising the combination of a sump for holding lubricant, a feeder circuit for distributing lubricant adapted to receive lubricant at either of two ends and permit flow of excess lubricant from the remaining end, a reverser connected to the two ends of the circuit and to the sump, and a pump connected to the sump and to the reverser for forcing lubricant from the sump to the reverser, through the feeder circuit to the reverser, and back to the sump, the reverser including a diverter valve, a reverser valve and a pilot valve, the diverter valve serving to connect each end of the feeder circuit either to the reverser valve or to the pilot valve and the pilot valve to the sump, the reverser valve serving to connect the diverter valve to the pump or to the sump, and the pilot valve serving to connect the reverser valve to the pump or to the sump, the diverter valve comprising a delay means for allowing compressed lubricant in the feeder circuit to expand through the reverser valve to the sump, prior to connection of the feeder circuit to the pilot valve.

4. Reverser apparatus for lubricating systems including a diverter valve comprising a cylinder, a pair of inlets at the ends of said cylinder, a pair of main outlets spaced inwardly from the ends of the said cylinder, and a pair of valve outlets spaced inwardly from the main outlets, a diverter piston in the cylinder comprising a plunger having collars at the middle and at each end thereof in fluid-tight engagement with the walls of the cylinder, the piston acting to connect the inlet and main outlets at one end of the cylinder and the main outlet and valve outlets at the remaining end of the cylinder when the piston is positioned at either end of the cylinder, a fluid inlet, a reverser valve for connecting said fluid inlet to either of said diverter valve inlets comprising a second cylinder, an inlet connected to said fluid inlet, outlets disposed on each side of said inlet and passageways connecting said outlets with the inlets of the diverter valve, exhaust outlets on each side of said reverser valve inlet and beyond said reverser valve outlets, and a reverser piston in said second cylinder comprising a member having spaced collars in fluid-tight engagement with the walls of the cylinder, the said reverser piston acting to conenct the reverser valve inlet to either of the associated outlets and the remaining outlet to an associated exhaust outlet, and a pilot valve connected to the valve outlets of the diverter valve for controlling the position of the said reverser valve piston in response to flow of fluid from the said valve outlets.

5. The invention in accordance with claim 4, the said pilot valve comprising a pilot cylinder and piston, a longitudinal opening in the reverser valve piston and a pilot valve rod in the opening and connected to the piston for controlling flow of fluid from the fluid inlet to the ends of the cylinder to actuate the piston member.

6. The invention in accordance with claim 4, the said pilot valve comprising a pilot cylinder at each end of the reverser valve cylinder, a longitudinal opening in the reverser valve piston, a piston in each of the pilot cylinders and a pilot rod extending through the opening and connecting the pilot pistons, and lands on the pilot rod engaging the reverser valve piston and passageways in the reverser valve piston adapted to be opened and closed by the lands for controlling flow of fluid from the fluid inlet to the ends of the cylinder to actuate the piston member.

7. The invention in accordance with claim 4, the said reverser including an exhaust port positioned between the valve outlet ports of the diverter valve and adapted to be connected to either of the valve outlets by th diverter valve piston for exhausting accumulated fluid in the pilot valve through a valve outlet and the exhaust port when the pilot valve is actuated by fluid from the remaining valve outlet.

8. The invention in accordance with claim 4, the said pilot valve comprising a pilot cylinder at each end of the reverser valve cylinder and co-extensive therewith, an opening longitudinally through the reverser valve piston and a piston in each of the pilot cylinders, and a pilot rod extending through the opening and connecting the pilot pistons, an exhaust port in the diverter valve disposed between the valve outlet ports for connection to either of those ports by the diverter valve piston, and the connections between the pilot valve and the valve outlets of the diverter valve comprising passages extending from the valve outlets of the diverter valve to the outer ends of the pilot valve pistons, whereby the accumulated fluid in the ends of the pilot cylinders may be exhausted through the diverter valve when the pilot valve is operated.

9. The invention in accordance with claim 4, the said pilot valve comprising a pilot cylinder at each end of the reverser valve cylinder and co-extensive therewith, an opening longitudinally through the reverser valve piston and a piston in each of the pilot cylinders, and a pilot rod extending through the opening and connecting the pilot pistons, a closure member at each end of the reverser valve cylinder for separating the reverser valve cylinder from the pilot cylinders and each closure member having an inwardly extending portion surrounding the end of the reverser valve piston, an opening in each end of the reverser valve piston extending from the longitudinal opening and closed by the pilot rod for transmitting fluid from the inlet to the interior of the closure members to actuate the reverser piston and an opening through the reverser valve at each end thereof adapted to be closed by the pilot rod and to be opened to provide fluid communication between the interior of the closure members and the reverser valve exhaust outlets to exhaust fluid from within the closure member and permit the reverser valve piston to be moved when the pilot valve rod is shifted to actuate the reverser valve.

10. A reverser for lubricating systems including a housing, a diverter valve comprising a cylinder in said housing, and a piston, the said diverter valve having two inlets and two main outlets, an exhaust outlet and two valve outlets, the main outlets being adapted to be connected to the ends of an external fluid circuit and the exhaust outlet being adapted to be connected to a sump, the piston serving to interconnect a main outlet with an associated inlet, the remaining main outlet with an associated valve outlet, and the remaining valve outlet with the exhaust outlet when positioned at either end of the cylinder, a reverser valve comprising a cylinder in said housing and a piston in the cylinder, the said reverser valve having an inlet, two main outlets and two exhaust outlets, the main outlets being connected to the inlets of the said diverter valve and the exhaust outlets being adapted to be connected to a sump and the said piston being atapted to interconnect the inlet with either main outlet and the remaining main outlet with an associated exhaust outlet, and an opening longitudinally through the reverser valve piston adapted to receive a pilot valve rod, an opening transversely through the reverser valve piston and communicating with the valve inlet and the longitudinal opening, pilot valve outlet openings in the reverser valve piston, each extending from the longitudinal opening to the ends of the piston, and pilot valve exhaust outlet openings in the reverser valve piston, each extending from the longitudinal opening transversely through the reverser valve piston and communicating with the reverser valve exhaust outlets, and a pilot valve comprising a cylinder in the housing at each end of the reverser valve cylinder, an inlet at the end of each cylinder, each inlet being connected to one of the valve outlets of the diverter valve, a piston in each cylinder, and a pilot rod extending through the reverser valve piston and connected to the pilot valve pistons, the said pilot valve rod including lands engaging the reverser valve piston for interconnecting either of the pilot valve outlet openings in the reverser valve piston with the transverse opening and the pilot valve exhaust outlet opening at the remaining end of the reverser valve piston with the reverser valve cylinder.

11. The invention in accordance with claim 10, the said reverser valve and diverter valve cylinders comprising openings extending through the reverser housing and the pilot valve cylinders comprising openings in end blocks mounted at the ends of the said housing.

12. The invention in accordance with claim 10, the said reverser valve and pilot valve cylinders comprising co-extending bores and the ends of the reverser valve cylinder being separated from the pilot valve cylinders by cylinder closures comprising members fitted within the reverser valve cylinder at the end thereof.

13. The invention in accordance with claim 12, the reverser valve exhaust outlets being separated from the ends of the reverser valve pistons by portions of the closure members extending within the reverser valve cylinder and engaging the outside of the reverser valve piston near the ends thereof.

14. A fluid-flow reverser comprising in combination a valve housing having a reverser valve bore and a diverter valve bore therein, with an inlet port to the reverser valve bore, substantially intermediate the ends thereof, a pair of circuit outlet ports from the diverter valve bore, near the ends thereof, exhaust openings from said bores and a plurality of interconnecting passageways between said bores, a hollow longitudinally slidable valve member in said reverser valve bore, a pilot valve rod within said hollow valve member, a pair of partitions separating the reverser bore into a central chamber and end chambers, pistons in the end chambers connected to the pilot valve rod and a piston longitudinally movable in said diverter valve bore having recessed portions between the center thereof and the ends thereof, one of said interconnecting passageways having an inlet from said reverser bore longitudinally spaced from the inlet port and an outlet to the corresponding end of the diverter bore, a second of said interconnecting passageways having an inlet from said reverser bore longitudinally spaced from said inlet port in the opposite direction from said first passageway and an outlet to the opposite end of the diverter bore, a third of said interconnecting passageways extending between one end of the reverser bore and the side of the diverter bore at a point spaced from the center thereof, toward the corresponding end of said bore, a fourth of said interconnecting passageways extending between the opposite end of the reverser bore and the side of the diverter bore at a point spaced from the center thereof toward the corresponding end of the reverser bore, said hollow valve member having a centrally disposed recess of sufficient length to connect said inlet port either to the first or to the second interconnecting passageway according to the position of said hollow valve member, having an inlet opening extending from said recess to the interior of said valve member, longitudinal passageways each having an outlet at the end of the member and an inlet from the interior of the member at a point spaced from the said inlet opening, and exhaust openings each extending between the interior of the member and the periphery at a point between the end of the member and the inlet to the longitudinal passageway, and said pilot valve rod having sealing heads each of sufficient length to close either the adjacent longitudinal passageway inlet or exhaust opening, and the sealing heads being spaced sufficiently to connect said inlet opening with either longitudinal passageway.

15. A fluid-flow reverser comprising in combination a diverter valve, a valve housing having a reverser valve bore therein, with an inlet port to the reverser valve bore substantially intermediate the ends thereof, a pair of outlet ports on either side of the inlet port and exhaust openings from said bore, a pair of circuit outlet connections from the assembly, a hollow, longitudinally slidable valve member in said reverser bore, a pilot valve rod within said hollow valve member, and pistons actuated by the ends of said pilot valve rod having operating cylinders cooperating therewith, said hollow valve member having a centrally disposed recess of sufficient length to connect said inlet port either to the first or to the second of said outlet ports according to the position of said valve member, having an inlet opening extending from said recess to the interior of said member, longitudinal passageways, each having an outlet at the end of said member and an inlet from the interior of the member at a point spaced from the inlet opening, and exhaust openings each at a point between the end of the member and the inlet to the longitudinal passageway, said pilot valve rod having sealing heads each of sufficient length to close either the adjacent longitudinal passageway inlet or exhaust opening, and the sealing heads being spaced sufficiently to connect said inlet opening with either longitudinal passageway, said diverter valve having connections to said outlet ports, said circuit outlets, and said pilot valve operating cylinders for simultaneously connecting one of said circuit outlet connections to one of said pilot valve operating cylinders and connecting the other of said circuit connections to the outlet port of the reverser bore at the opposite end from said pilot rod operating cylinder, whereby fluid entering the inlet port passes through one of said outlet ports and one of said circuit outlet connections, is adapted to pass through an external circuit and return through the other outlet circuit connection, and upon such return, applies force to one of said pistons for reversing the position of the pilot valve rod for causing the flow of fluid from the inlet port, through the inlet opening of the hollow valve member, out through the opposite longitudinal passageway for reversing the position of the hollow valve member and connecting the inlet port to the opposite exhaust port for reversing the flow of liquid in the said circuit outlet connections.

16. In a fluid-flow reverser valve mechanism, a valve housing having a reverser valve bore with an inlet port to the reverser valve bore intermediate the ends thereof, a pair of outlet ports on either side of said inlet port and exhaust openings from said bore, a hollow longitudinally slidable valve member in said reverser valve bore, a pilot valve rod within said hollow valve member, a pair of partitions separating the reversing valve bore into a central chamber and end chambers, and pistons in the end chambers connected to the pilot valve rod, the said hollow valve member having a centrally disposed recess of sufficient length to connect said inlet port either to the first or to the second outlet port according to the position of said hollow valve member, and having an inlet opening extending from the recess to the interior of the member, longitudinal passageways each having an outlet at the end of the member and an inlet from the interior of the member spaced from the said inlet opening, and exhaust openings each extending between the interior of the member and the periphery at a point between the end of the member and the inlet to the longitudinal passageway, and said pilot valve rod having sealing heads each of sufficient length to close either the adjacent longitudinal passageway inlet or exhaust opening, and the sealing heads being spaced sufficiently to connect said inlet opening with either longitudinal passageway.

17. In a fluid-flow reverser valve mechanism, a valve housing having a reverser valve bore with an inlet port to the reverser valve bore substantially intermediate the ends thereof, a pair of outlet ports on either side of the inlet port adapted to be connected to a pipe circuit, a hollow longitudinally slidable valve member in said reverser valve bore, a pilot valve rod within said hollow valve member, the said hollow valve member having a central recess of sufficient length to connect the said inlet port to the said first or second outlet port according to the position of said hollow member for causing flow of fluid from one or the other of said outlet ports, having an opening extending from the recess to the interior of the member, longitudinal passageways, each having an outlet at the end of the member and an inlet from the interior of the member spaced from the said inlet opening, and exhaust openings, each extending between the interior of the member and the periphery at a point between the end of the member and the inlet to the longitudinal passageway, and said pilot rod having sealing heads, each of sufficient length to close either the adjacent longitudinal-passageway inlet or exhaust opening, said sealing heads being spaced sufficiently to connect said inlet opening with either longitudinal passageway and means for applying pressure of return fluid to one or the other of said pistons for shifting the position of the pilot valve rod to open a passageway to the opposite end of the hollow valve member for shifting its position to cause reversal of fluid flow.

18. In a fluid-flow reverser valve mechanism, a valve housing having a reverser valve bore with an inlet port intermediate the ends thereof and outlet ports on either side of said inlet port, adapted to be connected to an external fluid circuit including a return circuit for returning at least a portion of the fluid to the valve, a hollow valve member longitudinally movable in said reverser-valve bore, a pilot valve rod within said hollow valve member, and means for longitudinally moving said pilot valve rod in response to pressure of return fluid comprising pistons in the reverser valve bore at each end thereof connected to the pilot valve rod, said hollow valve member having a centrally disposed recess of sufficient length to connect said inlet port either to the first or second outlet port according to the position of said hollow valve member, said pilot valve rod and said hollow valve member having ports and passageways for directing pressure from said inlet port to the end of the hollow valve member for shifting said member to the opposite end of said reverser valve bore when the pilot valve rod is shifted away from said opposite end, and closure members in the bore toward the ends thereof for separating the portions of the bore in which the pilot valve pistons move from the ends of the hollow valve member, the said closure members engaging the housing and receiving the pressure fluid issuing from the ports and passageways of the hollow valve member.

19. In a fluid-flow reverser valve mechanism, a valve housing having a reverser valve bore with an inlet port intermediate the ends thereof, adapted to be connected to an external fluid circuit including a return circuit for returning at least a portion of a fluid to the valve, a hollow valve member longitudinally movable within the said bore, a pilot valve rod within the said valve member means for longitudinally moving said pilot valve rod in response to pressure of fluid comprising pistons in the reverser valve bore at each end thereof connected to the pilot valve rod, said hollow valve member having a centrally disposed recess of sufficient length to connect said inlet port either to the first or second outlet port according to the position of said hollow valve member, said pilot valve rod and said hollow valve member having ports and passageways for directing pressure from said inlet port to the end of the hollow valve member for shifting said member to the opposite end of said reverser valve bore when the pilot valve rod is shifted away from said opposite end, and closure members in the bore toward the ends thereof for separating the portions of the bore in which the pilot valve pistons move from the ends of the hollow valve member, the said closure members engaging the housing and receiving the pressure of fluid issuing from the ports and passageways of the hollow valve member and including annular portions extending over the ends of the hollow valve member and engaging the outside thereof for forming an outer chamber in the bore adapted to be connected to an exhaust outlet by movement of the pilot valve rod.

References Cited in the file of this patent

UNITED STATES PATENTS

| Number | Name | Date |
|---|---|---|
| 18,225 | Ruberts | Sept. 15, 1857 |
| 343,569 | Cooper | June 15, 1886 |
| 401,924 | Barth | Apr. 23, 1889 |
| 1,041,697 | Sweningson et al. | Oct. 15, 1912 |
| 1,920,003 | Chenault | July 25, 1933 |
| 2,022,005 | Leonard | Nov. 26, 1935 |
| 2,182,908 | Wegerdt | Dec. 12, 1939 |
| 2,380,315 | Killian | July 10, 1945 |